Nov. 4, 1930.                V. G. APPLE                1,780,455
FRICTION DEVICE
Filed June 14, 1928
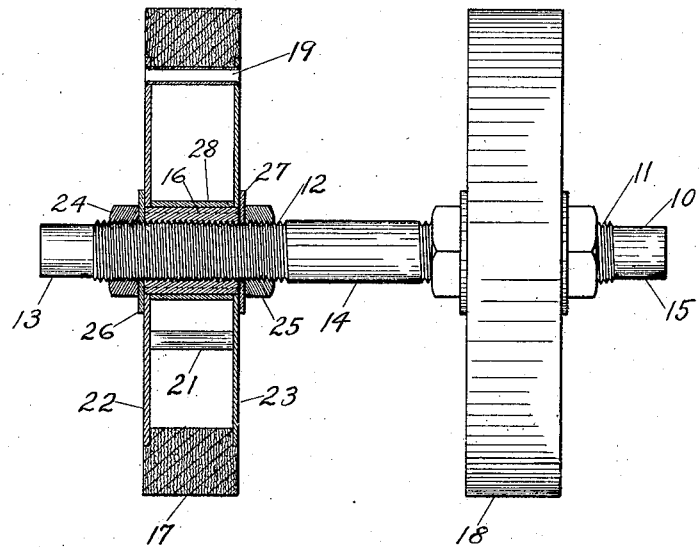
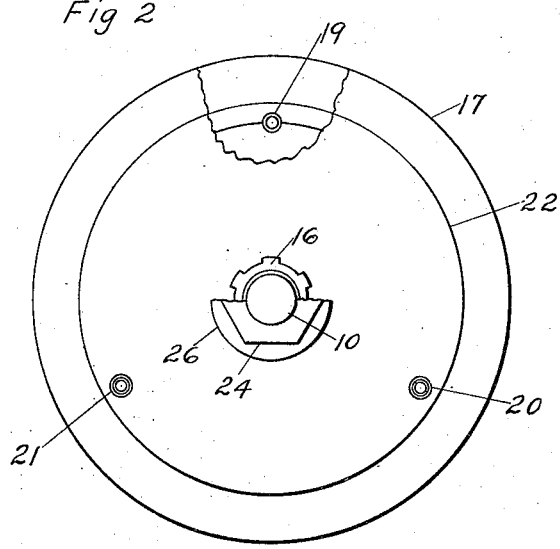
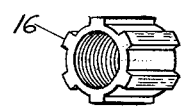
INVENTOR
Vincent G. Apple Patented Nov. 4, 1930

1,780,455

UNITED STATES PATENT OFFICE

VINCENT G. APPLE, OF DAYTON, OHIO

FRICTION DEVICE

Application filed June 14, 1928. Serial No. 285,352.

The invention relates to improvements in the type of friction tension wheel known in the art as a pressing roller which is used extensively on spinning frames in textile mills, and which usually consists of a hexagonal shaft with ends and central part turned round for bearings, and two belt-leather tired wooden wheels driven on the remaining hexagonal spaces, so that the wheels may be spaced closer or farther apart as required by driving the wheels in a direction along the axis of the shaft.

Some of the objects of my invention are to provide a tire of better material, which is more readily renewable, and which will stand truing up oftener because of its increased cross section, and a mechanical construction which facilitates the adjustment of the wheels along the axis of the shaft as well as allowing a ready renewal of worn parts.

A form of my invention is illustrated in the accompanying drawing wherein—

Fig. 1 is a plan view of the assembled structure with one of the wheels shown in section.

Fig. 2 is an end view with part broken away to show the interior construction of one wheel.

Fig. 3 is a detail of the wheel hub.

Similar numerals refer to similar parts thruout the several views.

A shaft 10 is threaded at 11 and 12 leaving bearings 13, 14 and 15.

Hubs 16 having their inside diameter threaded to correspond to the threads on the shaft are screwed on to the threaded parts thereof.

The tires 17 and 18 which may be made of molded paper, cloth or other fibrous composition held together by suitable synthetic resin, furnishing the desired strength and surface texture, are provided at their inner diameters with semi-circular notches which engage tubular rivets 19, 20 and 21 and have their sides recessed to receive plates such as 22 and 23.

These plates 22 and 23 have holes, near their outer circumference for rivets 19, 20 and 21 which also correspond to the driving notches at the inner diameter of the tires and the center holes are of such form as to fit over the splined hub 16.

After two plates as 20 and 21 are securely riveted to each tire to form the web of the wheels they are slipped over the splined hubs on the shaft.

Nuts 24, 25, etc., bearing against washers 26, 27, etc., serve to securely hold the wheel in any desired axial position on the shaft within the range of the threaded portion.

Previous to riveting the tires and side plates together a length of tubing as at 28 is placed between the plates. This tubing serves to keep the side plates from being bowed in from the pressure of the nuts 24 and 25 when they are tightened.

While I have here illustrated and described a form of my invention embodying specific mechanical details it is to be understood that I do not wish to limit myself to the particular details shown as many variations in the structure may be made without departing from the spirit of the invention as embraced in the following claims.

I claim:

1. In pressing rollers, the combination of a shaft with portions of its diameter threaded, hubs with threaded inside and splined outside diameters disposed on said shaft, wheels with splined inside diameters surrounding said hubs and a common means to lock said wheels and hubs against rotative and axial shift on the shaft.

2. In pressing rollers, the combination of a shaft with portions of its diameter threaded, hubs with threaded inside and splined outside diameters disposed on said shaft, wheels with splined inside diameters surrounding said hubs, means to axially adjust the wheels on the shaft and a common means to lock said wheels and hubs against rotative and axial shift on the shaft.

3. In pressing rollers, the combination of a shaft with portions of its diameter threaded, hubs with threaded inside and splined outside diameters disposed on said shaft, discs with splined holes at their central portions surrounding said hubs, rims of fibrous friction material carried by said discs, means to axially shift the various parts on the shaft and a common means to lock them against rotative and axial shift on the shaft.

4. In pressing rollers, the combination of a shaft having a journal at each end and another in the middle with the intermediate portions threaded, hubs having internal threads to correspond to said shaft threads surrounding said threaded portions, integral splines extending outwardly from said hub, correspondingly splined round sheet metal plates surrounding said hub at each end, a tubular spacer surrounding said hub between said plates, a rim of friction material held concentrically supported between said plates at their outer edge, means to secure the plates and rim against relative rotative movement, and nuts on said shaft to lock the hubs and shaft both against relative rotative movement and against relative axial movement, as and for the purpose disclosed.

In testimony whereof I hereunto set my hand.

VINCENT G. APPLE.